United States Patent [19]

Yuen

[11] Patent Number: 5,949,914
[45] Date of Patent: Sep. 7, 1999

[54] ENHANCING THE RESOLUTION OF MULTI-SPECTRAL IMAGE DATA WITH PANCHROMATIC IMAGE DATA USING SUPER RESOLUTION PAN-SHARPENING

[75] Inventor: Patrick W. Yuen, Northglenn, Colo.

[73] Assignee: Space Imaging LP, Thornton, Colo.

[21] Appl. No.: 08/819,046

[22] Filed: Mar. 17, 1997

[51] Int. Cl.$^6$ .............................. G06K 9/40; G06K 9/36; G06K 9/32

[52] U.S. Cl. .......................... 382/254; 382/266; 382/299; 382/276

[58] Field of Search ................................... 382/254, 191, 382/266, 279, 299, 276; 348/606, 625, 30, 630; 358/447, 532

[56] References Cited

U.S. PATENT DOCUMENTS 4,683,496  7/1987  Tom ........................................ 348/625

OTHER PUBLICATIONS

Yuen, Patrick, et al., "Constraining Information for Information for Improvements of MAP Image Super–Resolution," University of Arizona, 1994.

Hunt, B.R., "Imagery Super–Resolution: Emerging Prosepects," SPIE vol. 1567 Applications of Digital Image Processing XIV (1991), pp. 600–608.

Holmes, T.J., "Expectation–Maximization Restoration of Band–Limited, Truncated Point–Process Intensities with Application in Microscopy," J. Opt. Soc. Am.. A, vol. 6, No. 7, Jul. 1989, pp. 1006–1014.

Högbom, J.A., "Aperture Synthesis with a Non–Regular Distribution of Interferometer Baselines," Astron. Astrophys. Suppl. 15, 1974, pp. 417–426.

Lucy, L.B., "An Iterative Technique for the Rectification of Observed Distributions," The Astronomical Journal, vol. 79, No. 6, Jun. 1974, pp. 745–754.

Keel, W.C., "A Simple Photometrically Accurate Algorithm for Deconvolution of Optical Images," The Astronomical Society of the Pacific, 103, Jul. 1991, pp. 723–729.

Clark, B.G., "An Efficient Implementation of the Algorithm CLEAN," Astron. Astrophys. 89, (1980), pp. 337–378,.

Lucy, L.B., "Resolution Limits for Deconvolved Images," The Astronomical Journal, vol. 104, No. 3, Sep. 1992, pp. 1260–1265.

*Primary Examiner*—Bijan Tadayon
*Assistant Examiner*—Dmitry A. Novik
*Attorney, Agent, or Firm*—William W. Cochran, II

[57] ABSTRACT

The present invention discloses a super resolution pan-sharpening technique that is used to increase the resolution of a multi-spectral signal using a panchromatic signal. Typically, multi-spectral signals, i.e., signals that contain a defined spectral band, have lower resolution than panchromatic signals since the multi-spectral signals normally contain fewer photons and require larger detectors for similar exposure periods. The technique of the present invention utilizes the panchromatic signal to increase the resolution of the multi-spectral signals to provide an increased resolution color output. The resolution of other spectral signals, such as infrared signals and UV signals, or any other desired signal, can also be increased in accordance with the techniques of the present invention.

16 Claims, 10 Drawing Sheets

68 — MULTI SPECTRAL LOW RESOLUTION DETECTOR

721 MATRIX OF LOW RESOLUTION IMAGE DATA

ENHANCING THE RESOLUTION OF MULTI-SPECTRAL IMAGE DATA WITH PANCHROMATIC IMAGE DATA USING SUPER RESOLUTION PAN-SHARPENING

BACKGROUND OF THE INVENTION

A. Field of Invention

The present invention pertains generally to scanners and more particularly to enhancing the resolution of scan data.

B. Description of the Background

A common method of generating an image of an object is to scan the object with detectors and generate a display of the scanned information. Detectors that detect specific spectral bands can be used to generate a color image. For example, if detectors are used that are capable of scanning the spectral bands of three primary colors, a full natural color image can be generated of the object. Additionally, other spectral bands such as the infrared band or the ultraviolet band may also be useful for certain applications. In addition, images from various spectral bands can be combined to produce a wide variety of images.

The speed at which an object is scanned is determined by a wide variety of factors such as movement or change in the object, limitations relating to the mechanics of the system used for scanning, the exposure period of the detectors, the energy of the radiation being detected, etc. For example, space satellites move at various speeds with respect to the surface of the earth that define the scanning speed at which detectors and optics mounted in the space satellite are able to scan a predetermined area on the earth's surface. Consequently, exposure of the detectors must be sufficiently fast to match the speed at which the object is being scanned. As another example, it is desirable to have a document scanner, such as a flatbed document scanner, a copier, a fax machine, or any other type of scanner that scans documents, to scan the document as quickly as possible. In this case, the shorter the exposure period of the detector, the faster the document can be scanned.

To obtain a shorter exposure period for a detector, such as a charged coupled device (CCD), the size of the detector can be increased to capture more photons in a shorter period of time. However, increasing the size of each individual element of a detector such as a CCD linear array, decreases the resolution of the signal that can be obtained. Since fewer detector elements can be utilized, this problem can be further exacerbated by the fact that the detection of specific spectral bands of radiation reflected from an object normally limits the number of electrons that are sensed by the detector. For some energy bands of radiation, the sensitivity of each element of the CCD array may also be less which requires that each element of the array must be further increased in size. On the other hand, panchromatic detectors, i.e., black and white detectors that detect a wide spectral band of radiation, sense a much greater number of photons which allows the size of each of the panchromatic detector elements to be significantly decreased while maintaining the same exposure period. Hence, panchromatic detectors are capable of having a much higher resolution than detectors that detect only a narrow spectral band.

For high scanning speeds, such as in space-based detectors, aircraft-based detectors, etc., panchromatic detectors are capable of producing a much higher resolution signal than detectors that sense a narrow spectral band because the panchromatic detector elements can be made smaller. For document detectors, a desired resolution can be obtained at a much higher scanning speed with a panchromatic detector, than a detector that is designed to sense a spectral band for a primary color.

It would therefore be desirable to increase the resolution of the image data from detectors that detect a specific spectral band, which are collectively referred to herein as multi-spectral detectors that generate multi-spectral image data. Specifically, it would be desirable to increase the resolution of the multispectral detectors to a resolution that is equivalent to panchromatic detectors, that generate panchromatic image data. It is against this background and these problems and limitations that the present invention has been developed.

SUMMARY OF THE INVENTION

The present invention overcomes the disadvantages and limitations of the prior art by providing a method and apparatus that increases the resolution of multi-spectral image data to the resolution of panchromatic data.

The present invention may therefore comprise a method of enhancing the resolution of multi-spectral image data having a plurality of spectral bands using panchromatic image data having a data record size and resolution that is greater than the resolution of the multi-spectral image data comprising the steps of, using the Poisson Maximum A-Posteriori (MAP) super resolution technique for at least one iteration on each spectral band of said multi-spectral image data to generate pan-sharpened multi-spectral image data for each spectral band based on said panchromatic image data, combining the pan-sharpened multi-spectral image data for at least two of the spectral bands to produce pan-sharpened color image data that has a higher resolution than the multi-spectral image data, and generating a pan-sharpened color image from the pan-sharpened color image data.

The present invention may also comprise a method of generating multi-spectral images from first image data having at least two spectral bands with a predetermined first range of resolution and second image data having a third spectral band with a second range of resolution that is higher than the first range of resolution comprising the steps of, detecting an image to generate first and second image data, upsampling the first image data to match the data record size of the second image data to produce upsampled first image data, dividing the upsampled first image data by the second image data and subtracting one from the quotient to produce result data, exponentiating the second image data with the result data to produce pan-sharpened image data, and generating the multi-spectral images from the pan-sharpened image data.

The present invention may also comprise a device for generating high resolution multi-spectral data from low resolution multi-spectral data and high resolution panchromatic data comprising, a plurality of first detectors that generate the low resolution multi-spectral data, at least one second detector that generates the high resolution panchromatic data, a processor coupled to the plurality of first detectors and the second detector, the processor including, a divider that divides the low resolution multi-spectral data by the high resolution panchromatic data to produce a quotient, a subtractor that subtracts one from the quotient to produce result data, and an exponentiator that exponentiates the high resolution panchromatic data with the result data to produce the high resolution multi-spectral data.

The present invention may also comprise a system for generating high resolution multi-spectral images comprising, a multi-sensor detector that generates a plurality of low resolution multi-spectral data signals and at least one high resolution panchromatic data signal from an object that is scanned by the system, a processor coupled to the multi-sensor detector that divides the low resolution multi-spectral data signals by the high resolution panchromatic data signal to produce a quotient, subtracts one from the quotient and exponentiates the high resolution panchromatic data with the result data to produce pan-sharpened multi-spectral data, and a display that generates the high resolution multi-spectral image from the pan-sharpened multi-spectral data.

The advantages of the present invention are that higher resolution multi-spectral images can be generated at higher scanning speeds by modifying the lower resolution multi-spectral image data with the super resolution pan-sharpening technique. In this manner, the resolution of the panchromatic detectors can be provided for the multi-spectral data to produce high resolution multi-spectral images such as color images.

DETAILED DESCRIPTION OF THE PREFERRED EMBODIMENT OF THE INVENTION

Figure 1:
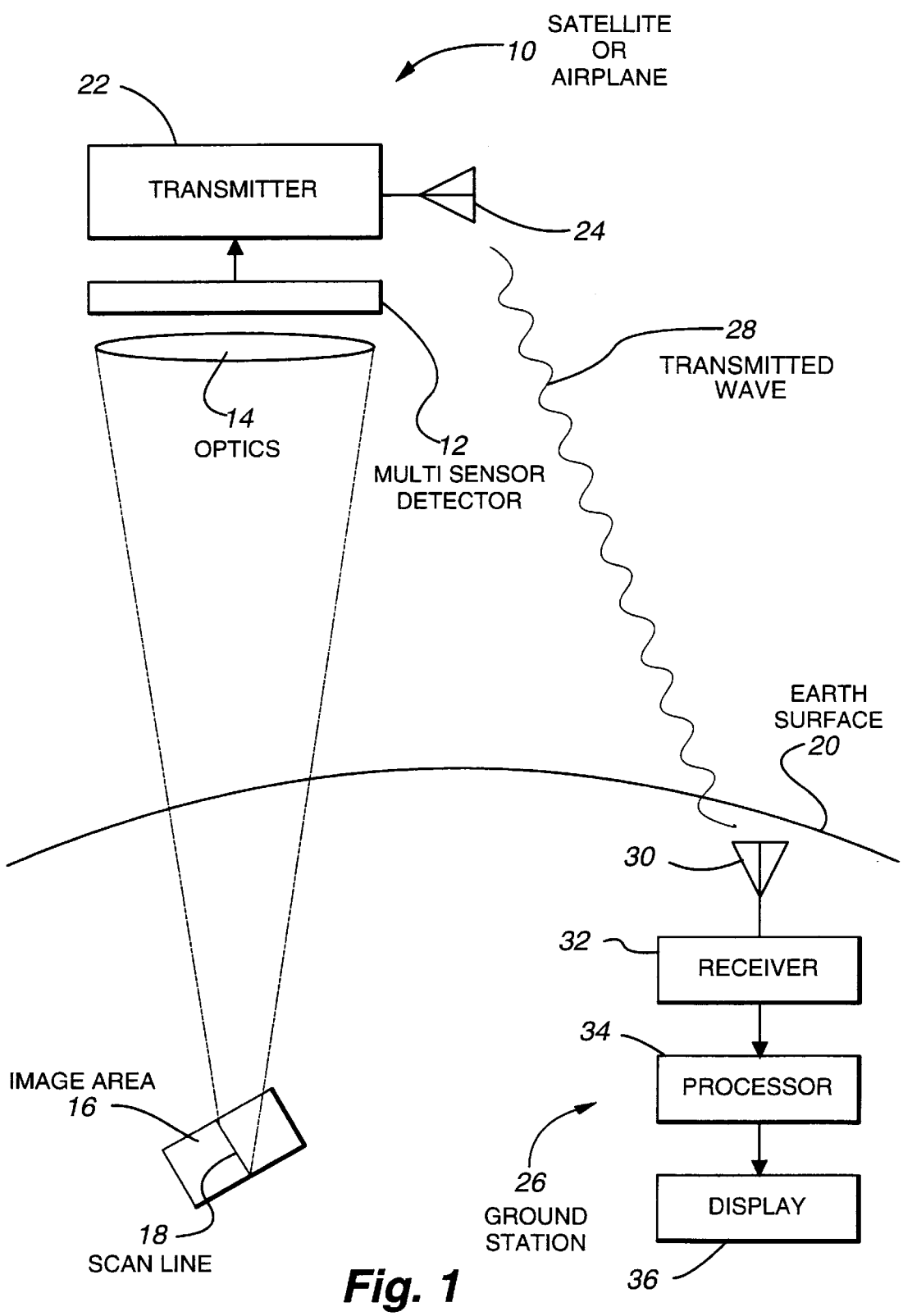
FIG. 1 is a schematic illustration of the manner in which the present invention may be implemented in a spaced-based system.

FIG. 1 is a schematic illustration of one implementation of the present invention. As illustrated in FIG. 1, a multi-sensor detector 12 is mounted in a satellite or airplane 10. The multi-sensor detectors 12 includes a plurality (more than one) of detectors that detect specific spectral bands of radiation and at least one panchromatic detector that is capable of detecting a wide spectral band of radiation. The multi-sensor detectors 12 are aligned with optics 14 that image an object, such as the surface of the earth, in a particular image area 16. The multi-sensor detectors 12 may take the form of linear arrays such that the image area is scanned across a scan line 18 as the satellite or airplane 10 moves relative to the surface of the earth 20. The image data generated by the multi-sensor detectors 12 is coupled to transmitter 22 that transmits the multi-sensor image data via antenna 24 to a ground station 26 via a transmitted wave 28.

Transmitter 22 may include analog to digital converters that convert the multi-sensor detector image signals into binary data for transmission to ground station 26. Ground station 26 includes an antenna 30 that receives the transmitted wave 28. Antenna 30 is connected to a receiver 32 that processes the signal and applies the signal to processor 34. Processor 34 processes the received signal and generates a high resolution multi-spectral image signal that is coupled to display device 36 that generates an image from the high resolution multi-spectral image signal. The display may comprise a printer for printing an image, a cathode ray tube for displaying the image, etc. Transmitted wave 28 may comprise either a digital or analog-type signal. Error correction processing may be provided in ground station 26 to insure reception of a correct signal from the satellite or airplane 10.

Figure 2:
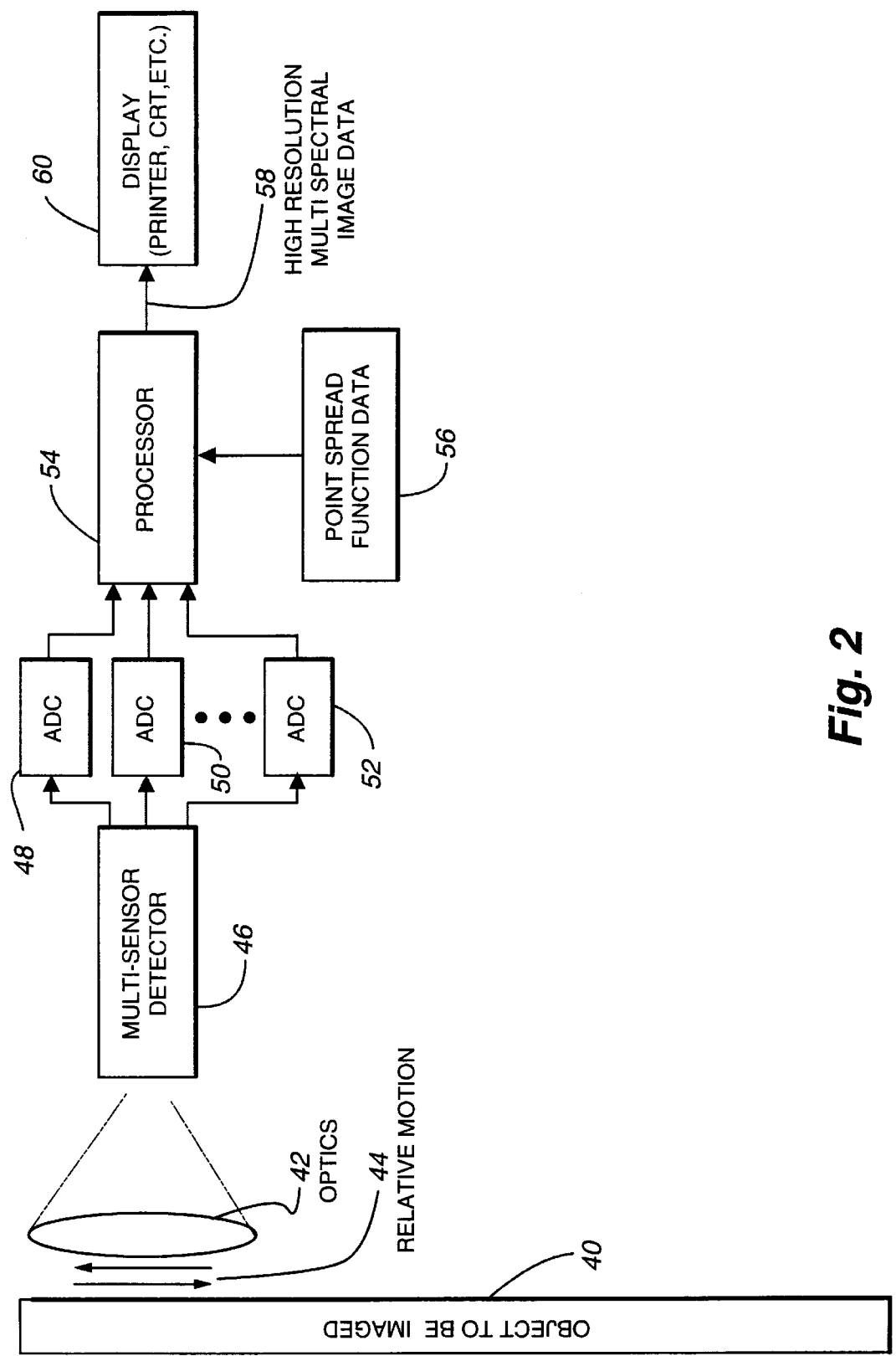
FIG. 2 is a schematic block diagram of a generalized implementation of the present invention.

FIG. 2 is a schematic illustration and block diagram of a more generalized implementation of the present invention. As shown in FIG. 2, an object 40 to be imaged by the system of the present invention is located in relation to optics 42 so that optics 42 can generate a focused image of the object 40. Object 40 can comprise any desired object to be imaged, including a portion of the surface of the earth, a document, photographs, charts, displays, etc. Relative motion as indicated by arrows 44 may be required to capture an entire image of object 40. For example, in a document scanner, which is used in flatbed scanners and copiers, relative motion is generated between the sensors and the document.

FIG. 2 further illustrates the manner in which optics 42 generate a focused image on the multi-sensor detector 46. Multi-sensor detector 46 includes a plurality of detectors for detecting specific spectral bands, as well as a panchromatic detector that detects a wide range of spectral frequencies. The signals generated from each of the sensors is applied to separate analog to digital converters 48, 50, 52 that convert the detector signals to binary data. The binary data is then applied to processor 54. Processor 54 processes the multi-spectral image data and the panchromatic image data together with point spread function data that is stored in memory 56 to produce high resolution multi-spectral image data 58 that is applied to display device 60 that may comprise a printer, cathode ray tube, etc.

Figure 3:
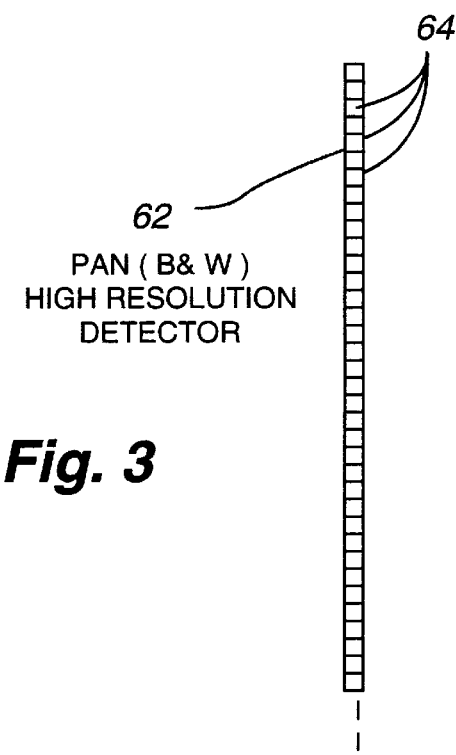
FIG. 3 is a schematic illustration of the panchromatic high resolution linear detector such as a CCD array.

FIG. 3 is a schematic illustration of a panchromatic high resolution linear detector. Linear detector 62 may comprise a CCD linear array that has a series of detector elements 64 aligned in a linear fashion. A typical array may contain from several thousand to 4,000 detector elements or more, depending upon the required exposure and resultant resolution of the image data generated by detector 62.

Figure 4:
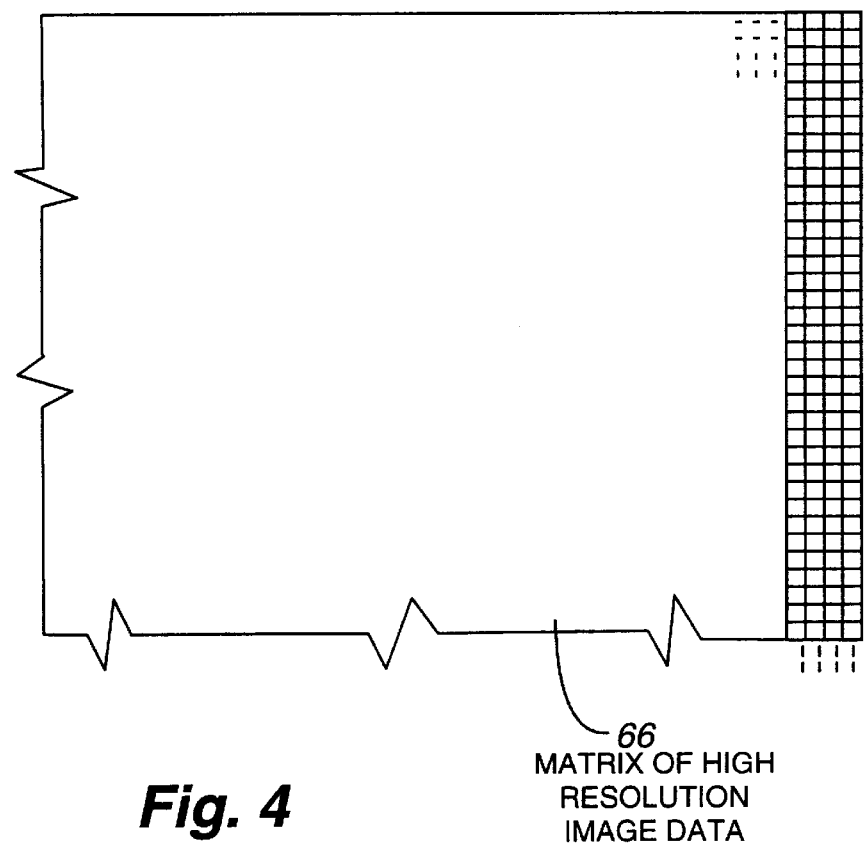
FIG. 4 is a schematic illustration of the matrix of data that is generated by the panchromatic high resolution image detector.

FIG. 4 is a schematic illustration of the matrix of high resolution image data 66 that is generated by the panchromatic high resolution detector 62. As the linear array detector 62 is scanned across the object to be imaged, a matrix of data is generated as illustrated in FIG. 4. This matrix of data is then used by the display device to produce an image.

Figure 5:
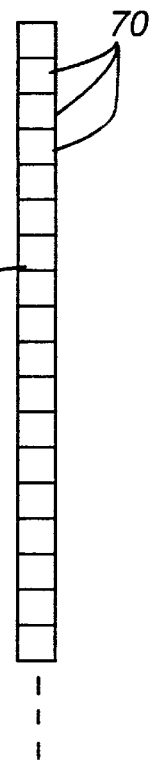
FIG. 5 is a schematic illustration of a multi-spectral low resolution detector.

FIG. 5 is a schematic illustration of a linear multi-spectral low resolution detector 68. When comparing the low resolution detector 68 of FIG. 5 with the high resolution detector 62 of FIG. 3, it can be seen that the low resolution detector 68 has a surface area which is approximately four times greater than the high resolution detector 62. As a result, the multi-spectral low resolution detector 68 has a resolution that is one-fourth of the resolution of the high resolution detector 62 of FIG. 3.

Figure 6:
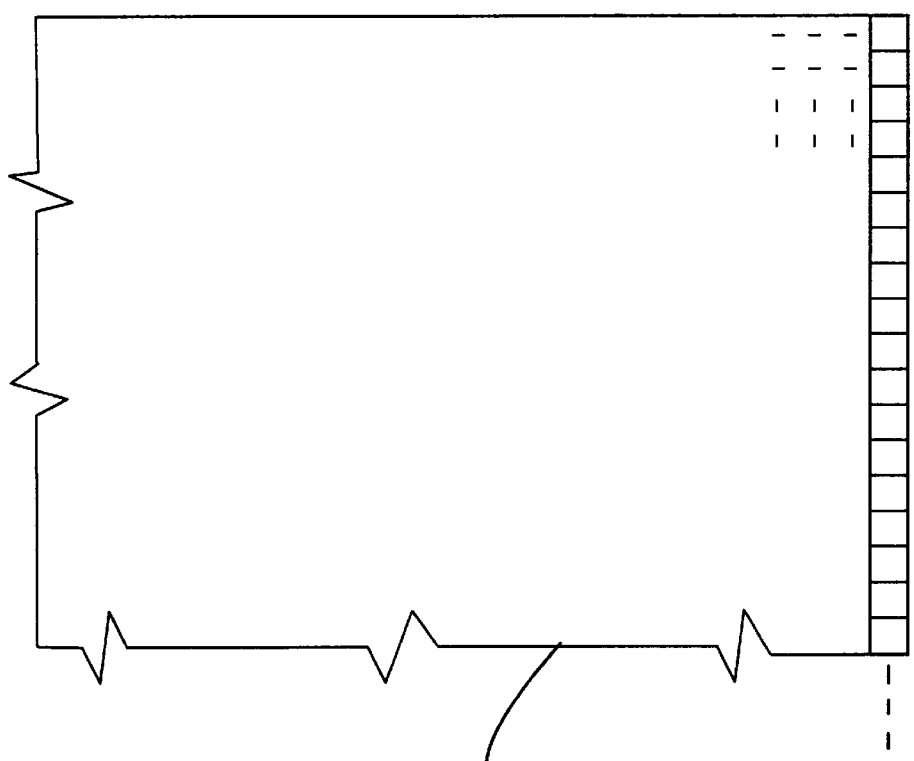
FIG. 6 is a schematic illustration of the matrix of low resolution image data generated by the multi-spectral low resolution detector.

FIG. 6 is a schematic illustration of the matrix of low resolution image data 72 that is generated by multi-spectral low resolution detector 68. As can be seen from FIG. 6, the matrix of low resolution image data 72 is a resolution that is one-fourth of the resolution of the matrix of high resolution image data 66 illustrated in FIG. 4.

Figure 7:
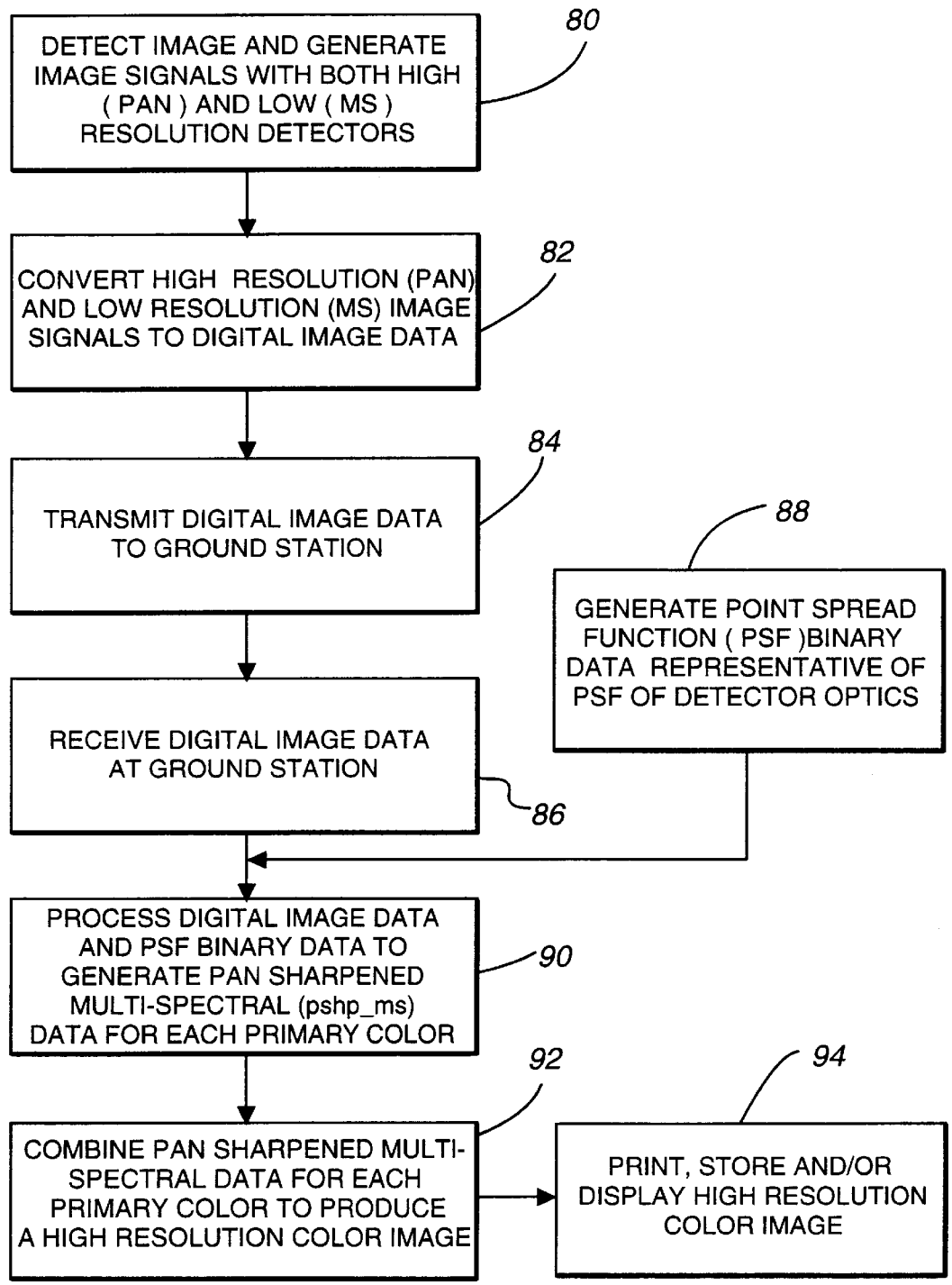
FIG. 7 is a schematic flow diagram of the manner in which the system of the present invention operates.

FIG. 7 is a schematic flow diagram that describes the manner of operation of the present invention. At step 80, the multi-sensor detector 46 (FIG. 2) detects an image of an object and generates image signals with both high and low resolution detectors. At step 82, the high resolution panchromatic signal and the low resolution multi-spectral image signals are converted to binary signals by the analog to digital converters 48, 50, 52 (FIG. 2). At step 84, this digital image data is transmitted to a ground station as illustrated in FIG. 1 and described above. As also illustrated in FIG. 1 and described above, the digital image data is received at the ground station at step 86 via transmitted wave 28. Prior to launching a detector system satellite, the detector optics are tested to determine a point spread function that describes distortion of the optical system. This point spread function is generated and stored at step 88. At step 90, the point spread function data as well as the digital image data is processed by the processor such as processor 34 of FIG. 1 and processor 54 of FIG. 2 to generate the pan-sharpened multi-spectral image data for each primary color and any other spectral bands of interest such as IR bands, UV bands, narrow spectral bands of interest, etc.

As also shown in FIG. 7, at step 92 each of the pan sharpened multi-spectral image data signals that are generated by the processor can then be combined in a display device to generate a color image. At step 94 the color image is displayed by printing, storing and/or displaying utilizing a cathode ray tube or other high resolution display. Any desired method of displaying the high resolution color image can be utilized in accordance with the present invention.

The processing that is performed by the processors 34 of FIG. 1 and 54 of FIG. 2 uses a modified version of the Poisson Maximum A-Posteriori (MAP) super resolution technique that has been modified for the pan-sharpening process described herein. The MAP technique was originally developed for image restoration. Traditional linear methods of image restoration, such as inverse, and Wiener filtering, reconstruct the spatial frequency spectrum below the cutoff frequency of the optical transfer function, i.e., frequency transform of the point spread function that describes the distortion of the optical system. Non-linear methods, such as the method described herein, have the ability to reconstruct frequency components beyond the cut-off frequency. These non-linear methods of image restoration that attempt to resolve beyond the cut-off frequency are known as super resolution techniques.

According to the present invention, the entire object that is being scanned is assumed to be composed of a collection of discrete point sources. As such, each point source is assumed to emit photons independently in a quantum mechanical fashion that obeys Poisson statistics. Photons reflected or emitted from the object then pass through the optical system of the present invention. The focal plane of the imaging system can be regarded as a secondary object plane. Since the statistics of individual photons are governed by the Poisson process, all of the points on the secondary object plane must again be described by Poisson distribution. The iterative form of the Poisson Maximum A-Posteriori (MAP) super resolution algorithm can be expressed as:

$$f^{n+1} = f^n \exp\left[\left(\frac{g}{f^n * h} - 1\right) * h\right] \quad (1)$$

Where * denotes the convolution, g is the original blurred image to be restored, $f^{n+1}, f^n$ are the latest and previous estimated restored image and h is the point spread function (psf) of the optical system.

Equation 1 has some intuitively pleasing properties. The term inside the exponent can be regarded as a correction factor. When the latest estimate of $f^n$ is too large, the denominator inside the square brackets increases. This, in turn, will decrease the value inside the exponent and the next estimated $f^{n+1}$ will then be automatically compensated to a smaller value. Another interesting characteristics of Equation 1 is that when the latest estimate generates the exact original blurred image g, the term inside the square brackets becomes zero and the exponential becomes unity. This indicates that if the interactive method finds the true object, it will automatically lock-on and stop. Finally, for any object to be meaningful, the photon count has to be non-negative. It is noticed that if the initial estimate $f^o$ is non-negative, this will guarantee that each estimate is non-negative. Therefore, the apriori knowledge of non-negativity is preserved throughout the entire process.

The super resolution image restoration technique of FIG. 1 can be modified for pan-sharpening, i.e., the use of a panchromatic high resolution image signal of an object to increase the resolution of lower resolution multi-spectral image signals. In accordance with the modification of the super resolution image restoration technique disclosed in Equation 1, the original image g is substituted by one of the multi-spectral image signals, i.e., a signal generated by a detector that has detected a specific spectral band of photons emitted from the object being scanned. Each of the multi-spectral signals must be upsampled to match the data record size of the panchromatic image data signal. FIG. 4 illustrates that in one implementation of the present invention, the matrix of panchromatic image data has a record size that is approximately sixteen times as large as the matrix of each of the multi-spectral signals, such as illustrated in FIG. 6. Various techniques can be used for upsampling the multi-spectral image signals such as averaging of the closest data points, nearest neighborhood techniques, two-dimensional linear interpolation, or other well-known techniques for upsampling. Pixel replication using nearest neighborhood techniques generates less resolution loss but more interpolation error in the interpolated image. Two-dimensional interpolation techniques, e.g., bilinear interpolation can, of course, be employed. Although the quality of the pan-sharpened multi-spectral image is comparable using either one of these techniques, pixel replication using nearest neighborhood produces a slightly better image. Another advantage of this process is that no calculations are required to derive an interpolated pixel value, such as those required by two-dimensional interpolation.

Another modification of the image restoration technique of Equation 1, to perform pan-sharpening in accordance with the present invention, is to utilize the point spread function (psf) for a particular spectral band in place of h of Equation 1. The point spread function, of course, varies with the spectral band since the refractive properties of the optics change with frequency. Another modification of the image restoration technique, illustrated in Equation 1, is that the panchromatic image data is substituted as the initial estimate, $f^o$ in Equation 1. The panchromatic image data is first processed by a modular transfer function correction filter.

Equation 1 is therefore modified to produce pan-sharpened images as follows:

$$phsp\_ms = pan \cdot \exp\left[\left(\frac{ms+}{pan*psf} - 1\right) * psf\right] \quad (2)$$

where "ms+" denotes upsampled multi-spectral data for a single spectral band, "pan" denotes the panchromatic image data signal and "psf" denotes the point spread function. Equation 2 indicates that pan-sharpened multi-spectral data can be generated for each spectral band detected using the modified version of the MAP process. Equation 2 is based on the assumption that conservation of photons is valid throughout the whole process. Therefore, the point spread function (psf) of the system needs to be normalized. Again, this is achieved by first converting the point spread function to an optical transfer function (otf) through a transformation process such as a fast Fourier transform. Other types of transformation processes can be used in certain instances. The optical transfer function (otf) can be normalized by dividing the optical transfer function by the evaluation of the optical transfer function at its origin. In this manner, the optical transfer function is increased so that the area under the point spread function is unity.

Equation 2 indicates that the panchromatic data is convolved with corresponding point spread function for the spectral band of the particular multi-spectral signal being processed, which results in the generation of what has been referred to as "error" data. Convolution is actually performed by transforming the panchromatic data and the point spread function to the frequency domain, performing a matrix multiplication and transforming the result of the matrix multiplication back to the space domain. This error data is then divided into the upsample multi-spectral signal. The value of 1.00 is then subtracted from the quotient of that division to generate what is referred to as "result data," which is the data resulting from the operations inside the parentheses. The result data is then convolved with the point spread function, in the same manner as described above, to generate what is referred to as "correction data", which is the data resulting from the operations inside the brackets of Equation 2. The panchromatic data is then exponentiated with the correction data to generate the pan-sharpened multi-spectral image data.

The following pseudo code labels have been used to described the process of Equation 2:

"pan" indicates the panchromatic image data signal that is generated by a detector.

"pan spect" indicates the panchromatic signal that is transformed to the frequency domain.

"psf" indicates the point spread function that describes the distortion of the system in the space domain for a particular spectral band.

"otf" indicates the transformation of psf to the frequency domain.

"otf_norm" indicates the normalized optical transfer function.

"ms" indicates the image data signal generated by a detector.

"ms+" indicates an up-sampled ms signal.

"error_spec" indicates the result of the matrix multiplication of pan_spec and otf_norm.

"error" indicates the space domain transformation of error_spec.

"result" indicates the answer obtained by performing the processes inside the parentheses of equation 2.

"result_spect" indicates the frequency domain transformation of result.

"correct" indicates the answer obtained by performing the processes inside the brackets of equation 2.

"pshp_ms" indicates a pan-sharpened multi-spectral image data signal for a single spectral band.

Pseudo code for performing the processes indicated in equation 2 in a processor is given below:

1) otf=fft (psf). Fast Fourier transform of psf to otf.
2) otf_norm=otf/otf(o). Normalize the otf for conservation of photons.
3) ms=ms+. Multi-spectral band is upsampled.
4) pan_spect=fft(pan). Fast Fourier transform of pan to frequency domain.
5) error_spect=pan_spect * oft_norm. Matrix multiplication.
6) error=invfft (error_spect). Inverse Fourier transform to spice domain matrix.
7) result=(ms+/error)−1.0. Matrix division and subtraction.
8) result_spect=fft (result). Fourier transformation of result.
9) correct_spect=result_spect * oft_norm. Matrix multiplication.
10) correct=invfft (correct_spect). Inverse Fourier transform.
11) pshp_ms=pan * exp (correct). Exponentiation.

Figure 8A:
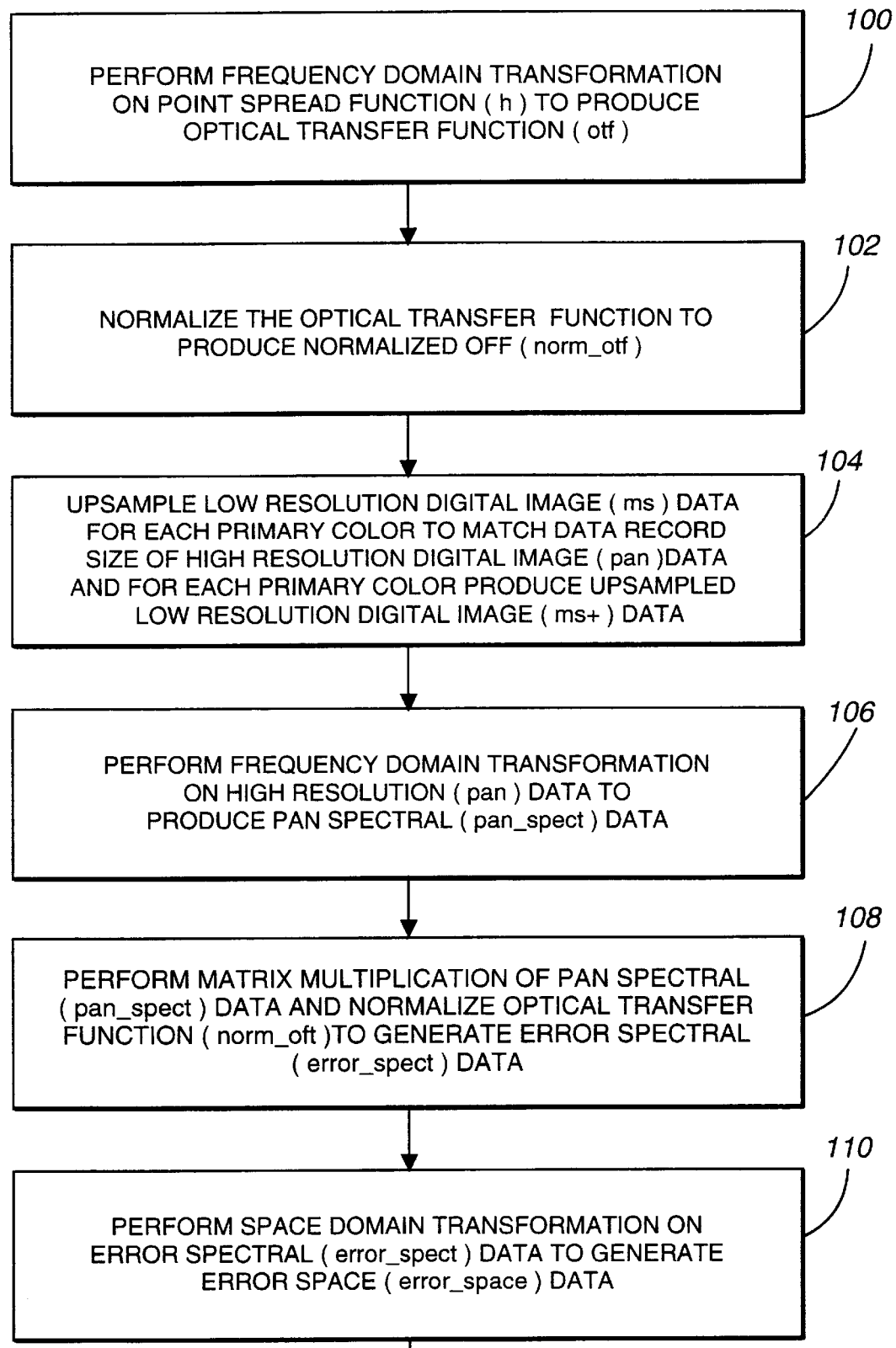
FIGS. 8A and 8B comprise a detailed flow diagram of the steps performed by the processor of the present invention.
Figure 8B:
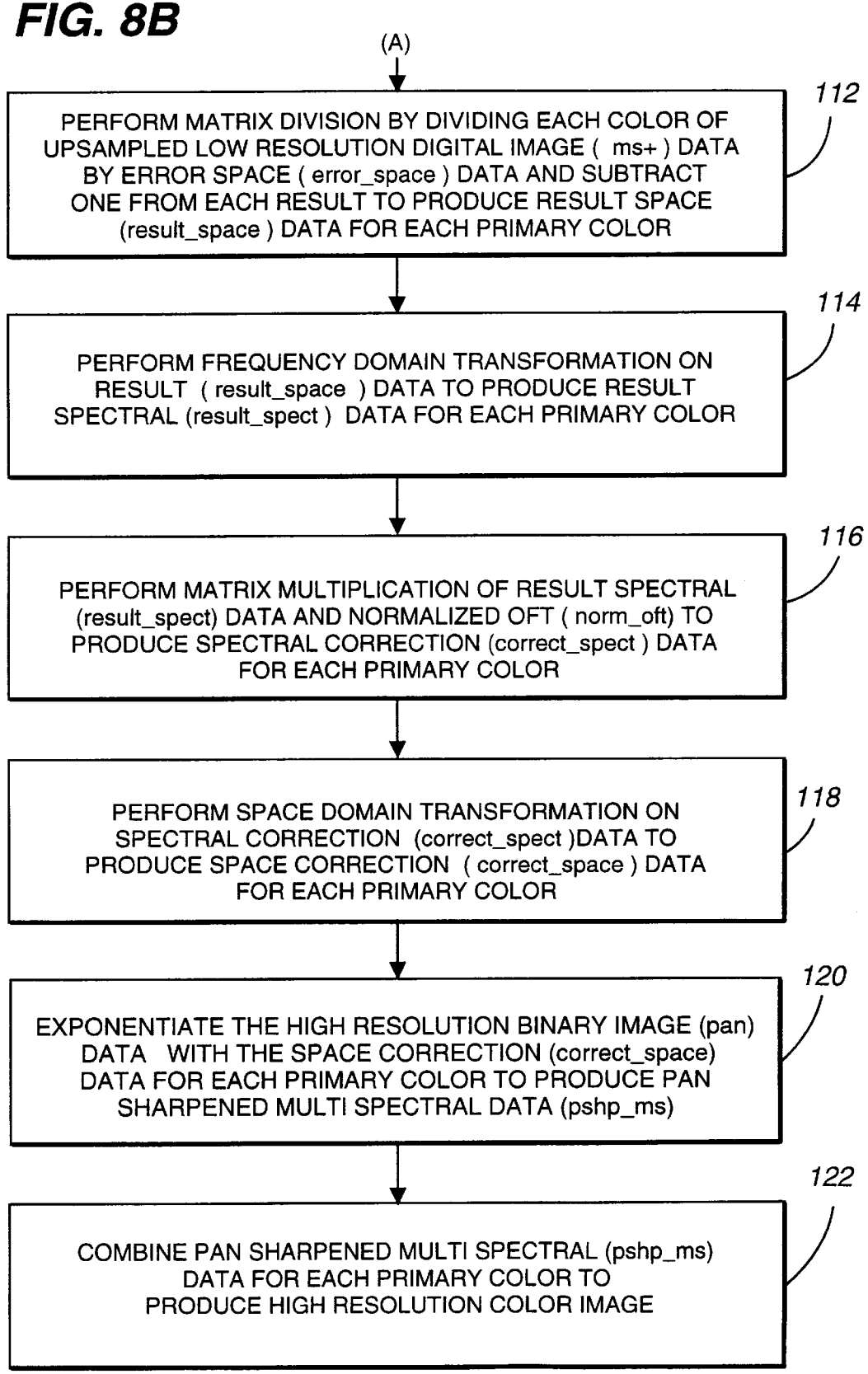

FIGS. 8A and 8B comprise a detailed block diagram of the processes performed by a processor in accordance with the present invention. At step 100, a frequency domain transformation is performed on the point spread function to produce the optical transfer function (otf). At step 102, the optical transfer function is normalized, in the manner described above, to produce a normalized optical transfer function (otf_norm). At step 104, the low resolution image data is upsampled for each spectral band, i.e., each output signal generated by each separate detector. This produces the upsampled low resolution image data (ms+). In other words, various detectors may be used to detect the image, including IR detectors, UV detectors, and a separate detector for each primary color. Each of these image data signals must be sharpened using the process of Equation 2 to produce pan-sharpened image data. At step 106, the high resolution panchromatic data is transformed to the frequency domain to produce panchromatic spectral (pan_spect) data. At step 108, a matrix multiplication is then performed between the matrix of panchromatic spectral data and the normalized optical transfer function to produce the error spectral data (error_spect). At step 110, a space domain transformation is performed on the error spectral data to generate error (error) transformed data. At step 112, a matrix division is performed by dividing the up-sampled low resolution image data signal (ms+) by the error data and subtracting one from the quotient to produce result data (result ) data. This process, of course, is performed for each spectral image signal for which pan-sharpening is desired. At step 114, a frequency domain transformation is performed on the result data to produce result spectral (result_spect) data. At step 116, a matrix multiplication is performed between the result spectral data and the normalized optical transfer function to produce spectral correction (correct_spect) data. At step 118, space domain transformation is performed on the spectral correction data to produce space domain correction data (correct). At step 120, the high resolution panchromatic image data is exponentiated with the space domain correction data for each primary color to produce the pan-sharpened multi-spectral data (pshp_ms). At step 122, the pan-sharpened multi-spectral data signals are combined in a display device to produce a high resolution color image.

Figure 9A:
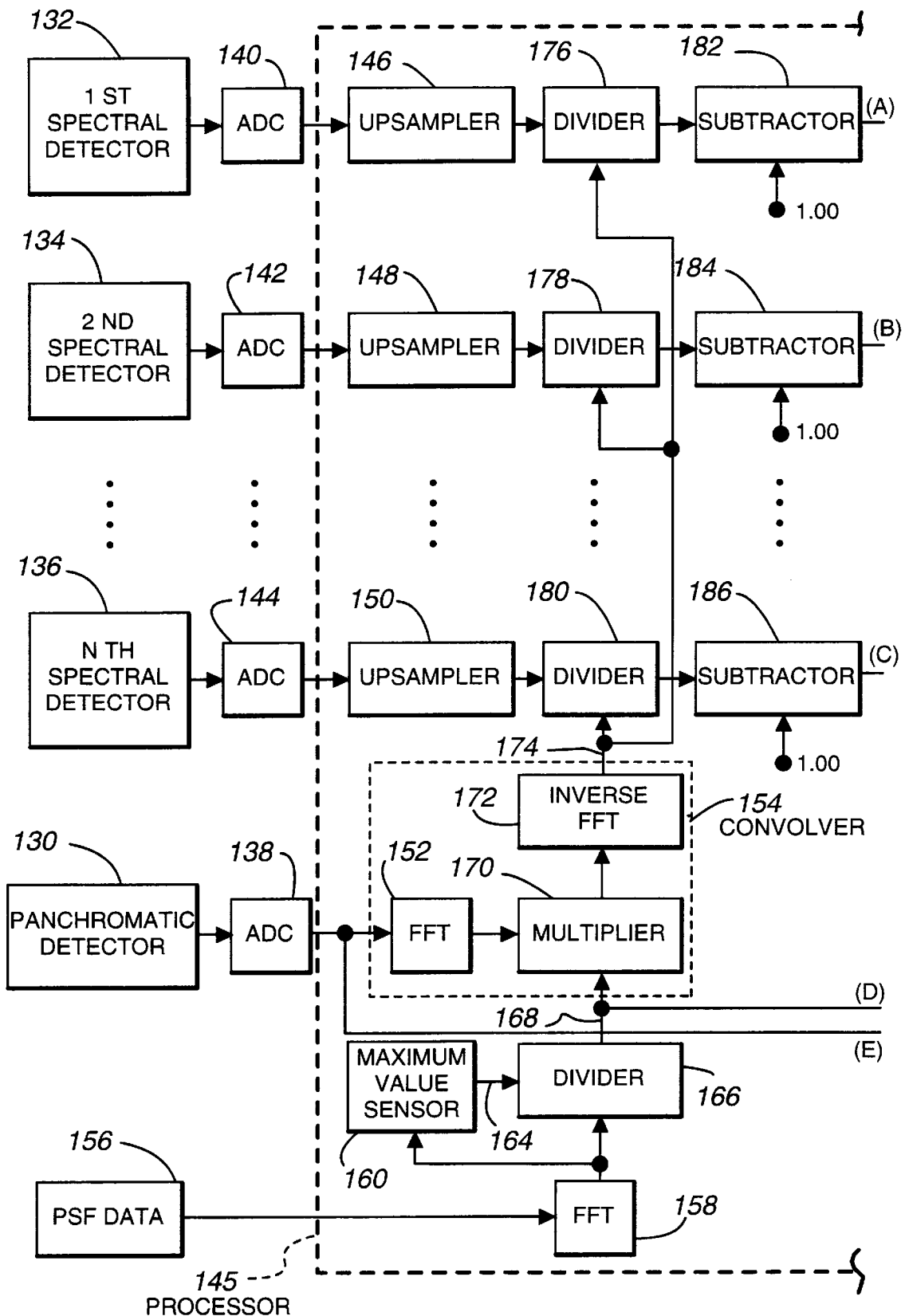
FIGS. 9A and 9B comprise a schematic block diagram of a device for carrying out the steps of the present invention.
Figure 9B:
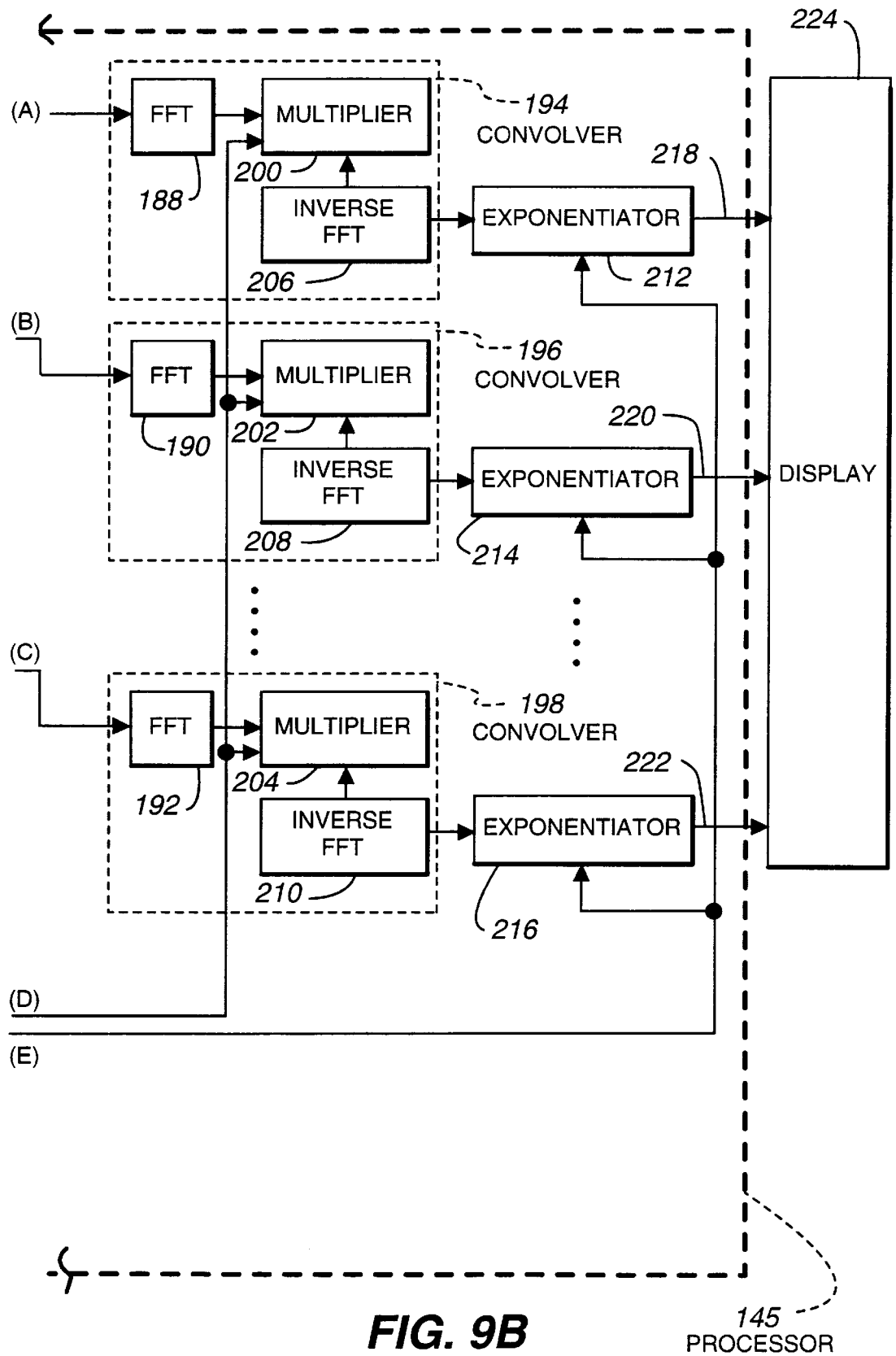

FIGS. 9A and 9B comprise a schematic block diagram that illustrates a special purpose device for carrying out the processing functions of the present invention. As shown in FIG. 9A, a series of detectors can be utilized in accordance with the present invention. As shown, a panchromatic detector 130 is provided, together with a first spectral band detector 132, a second spectral band detector 134, and continuing down to an nth spectral band detector 136. As indicated above, these various spectral bands can be spectral bands for primary colors, IR spectral bands, UV spectral bands, or any desired spectral band. Each of the detectors 130–136 is coupled to a series of analog to digital converters 138, 140, 142, 144. Each of the analog to digital converters 138–144 is coupled to the processor 145. Processor 145 can comprise a general purpose processor that has been programmed to perform the functions indicated by the various blocks in the processor 145, a state machine for carrying out these processes, or a hardware specific device for carrying out these functions. Analog to digital converters 140, 142, 144 are coupled to up-samplers 146, 148, 150 respectively. Analog to digital converter 138 is coupled to fast Fourier transform device 152 that forms part of convolver 154.

The point spread function data is stored in a storage device such as memory 156. Point spread function data is transferred to fast Fourier transform device 158 that transforms the point spread function data to the frequency domain to generate an optical transfer function (otf). The optical transfer function is evaluated in maximum value sensor 160 at its origin. Maximum value sensor 160 produces an output 164 that is representative of the value of the optical transfer function at its origin, which is its maximum value. This value is applied to divider 166 which divides the optical transfer function by the value of the optical transfer function at its origin to generate a normalized optical transfer function at output 168. The normalized optical transfer function is then applied to multiplier 170 in convolver 154. Multiplier 170 performs a matrix multiplication of the frequency transformed panchromatic data and the normalized optical transfer function. The result of the matrix multiplication is applied to inverse fast Fourier transform device 172 and produces an output 174 that is representative of the convolution of the panchromatic data and the point spread function data. This output 174 is referred to as the "error data". The error data 174 is then applied to dividers 176, 178, 180. The dividers 176–180 divide the upsampled multi-spectral data from each of the spectral detectors 132–136 by the error data. The quotients of these divisions from dividers 176–180 is applied to subtractors 182, 184, 186. Subtractors 182–186 subtract the value of 1.0 from each of the quotients to produce what is referred to herein as "result data". The result data from subtractors 182, 184, 186 is applied to fast Fourier transform devices 188, 190, 192 that form a part of convolvers 194, 196, 198, respectively. The fast Fourier transform devices 188, 190, 192 transform the result data into the frequency domain. The frequency transformed result data is applied to multipliers 200, 202, 204. The normalized optical transfer function produced at the output of divider 166 is also applied to each of the multipliers 200, 202, 204. Multipliers 200, 202, 204 perform a matrix multiplication on the normalized optical transfer function and the frequency transformed result data. The output of each of the multipliers is applied to inverse fast Fourier transform devices 206, 208, 210. The inverse fast Fourier transform devices transform the product of multipliers 200, 202, 204 from the frequency domain to the space domain. The output of inverse fast Fourier transform devices 206, 208, 210 is referred to as "correction data" herein. The correction data is then applied to exponentiators 212, 214, 216, together with the panchromatic data. Exponentiators 212, 214, 216 exponentiate the panchromatic data with the correction data to produce the pan-sharpened multi-spectral data at outputs 218, 220, 222. The pan-sharpened multi-spectral data 218, 220, 222 is applied to display device 224 for optical display.

After all the bands of the multispectral image have been pan-sharpened, the image is transformed from the RGB model to the HSI model. They are then further processed to enhance the image quality. Images in the RGB color model consist of three independent image planes, one for each primary color. In the case of the HSI (hue, saturation, intensity) model, hue (H) is a color attribute that describes a pure color, whereas saturation (S) gives a measure of the degree to which a pure color is diluted by white light and intensity (I) describes the brightness of the color. The advantage of processing a color image in the HSI model is that the intensity, I, is decoupled from the color information of the image. Since most of the information that is related to the image resolution is embedded in the intensity, image enhancement algorithms can be applied to the I component without worrying that the color balance will be disturbed throughout the process. Another advantage is that hue and saturation components are closely related to the way in which humans perceive color. These features make the HSI model an ideal tool to analysis and process the color image based on human visual perception.

The intensity and the saturation components yield values in the range [0,1], whereas hue yields values in the range [0°,360°]. The following are the formulas for the conversion from RGB to HSI:

$$I = 1/3(R + G + B) \quad (3)$$

$$S = 1 - \frac{3}{(R + G + B)}[\min(R, G, B)] \quad (4)$$

$$H = \cos^{-1}\left\{\frac{1/2[(R - G) + (R - B)]}{[(R - G)^2 + (R - B)(G - B)]^{1/2}}\right\} \quad (5)$$

where R,G,B have been normalized so that they are in the range [0,1]. Hue is not defined when the saturation is zero. Similarly, saturation is undefined if intensity is zero.

After the image has been transformed from the RGB model to the HSI model, a linear min-max stretch is applied to the saturation so that it will utilize the whole dynamic range of the saturation component between 0 to 1. Independently, the intensity component is spatially filtered by a high boost filter for edge enhancement. An examplary 3×3 pixel array which is used as the high boost filter is shown below:

| −1/9 | −1/9 | −1/9 |
| −1/9 | 17/9 | −1/9 |
| −1/9 | −1/9 | −1/9 |

The filtered pixels which have the intensity value beyond the dynamic range are saturated at both extremes of the range. This may generate the artifact of dark lines along some of the high contrast edges. The final step is to transform the image from the HSI model back to the RGB model.

The following are the formulas for the conversion from HSI to RGB:

For $0° < H \leq 120°$ $$b = 1/3(1-S) \quad (6)$$

$$r = 1/3\left[1 + \frac{S\cos H}{\cos(60° - H)}\right] \quad (7)$$

$$g = 1 - (r+b) \quad (8)$$

For $120° < H \leq 240°$ $$H = H - 120° \quad (9)$$

$$r = 1/3(1-S) \quad (10)$$

$$g = 1/3\left[1 + \frac{S\cos H}{\cos(60° - H)}\right] \quad (11)$$

$$b = 1 - (r+g) \quad (12)$$

For $240° < H \leq 360°$ $$H = H - 120° \quad (13)$$

$$g = 1/3(1-S) \quad (14)$$

$$b = 1/3\left[1 + \frac{S\cos H}{\cos(60° - H)}\right] \quad (15)$$

$$r = 1 - (g+b) \quad (16)$$

where R=3Ir, G=3Ig, B=3Ib and R,G,B are in the range [0,1]. The R,G,B are then rescaled back to the original dynamic range.

Figure 10:
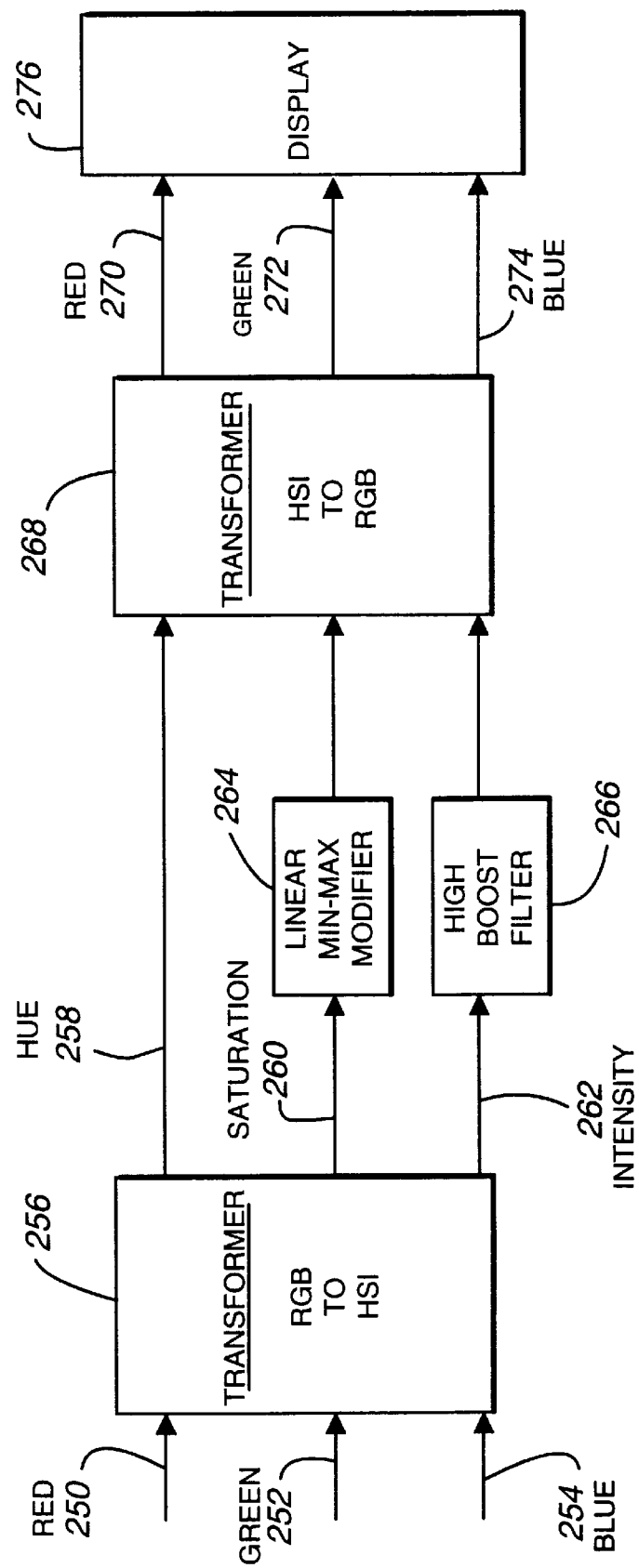
FIG. 10 is a schematic block diagram of the post pan-sharpening image enhancement devices of the present invention.

FIG. 10 is a block diagram of a system for post pan-sharpening image processing. After the pan-sharpening process has taken place such as illustrated in FIGS. 9A and 9B, the sharpened spectral signals are generated for display. These normally comprise three primary colors such as red, green and blue. As shown in FIG. 10, the pan-sharpened red signal 250, green signal 252, and blue signal 254 can be applied to a transformer 256 which transforms the red, green and blue signals to an HSI model in the manner described above. The output of transformer 256 comprises a hue signal 258, a saturation signal 260 and an intensity signal 262. The saturation signal 260 is applied to a linear min-max modifier 264 that modifies the range of the saturation signal such that its value varies between approximately 0 and approximately 1. Intensity signal 262 is applied to a high boost filter 266 which performs edge enhancement in the manner described above. These signals are then applied to transformer 268 that transforms the HSI model back to the RGB model. The output signals red 270, green 272 and blue 274 are then applied to a display 276 which can comprise any desired display such as a high resolution printer, a high resolution cathode ray tube device or other type of display.

The present invention therefore provides a unique manner of increasing the resolution of multi-spectral signals using a panchromatic signal. In this manner, detectors of lower resolution which must be made larger to detect a fewer number of photons in a narrower spectral band than a panchromatic detector can have an increased resolution which matches the resolution of the panchromatic detector.

The foregoing description of the invention has been presented for purposes of illustration and description. It is not intended to be exhaustive or to limit the invention to the precise form disclosed, and other modifications may be possible in light of the above teachings. For example, the panchromatic signal of the present invention may not have a frequency range that covers the frequency range of any one of the multi-spectral signals. In addition, although Equation 2 indicates a convolution with the point spread function, this step may not be required in some applications. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention, except insofar as limited by the prior art.

What is claimed is:

1. A method of enhancing the resolution of multi-spectral image data having a plurality of spectral bands using panchromatic image data having a data record size and resolution that is greater than said resolution of said multi-spectral image data comprising the steps of:

using a modified Poisson Maximum A-Posteriori (MAP) super resolution technique for at least one iteration on each spectral band of said multi-spectral image;

generating pan-sharpened multi-spectral image data for each said spectral band based on said panchromatic image data;

combining said pan-sharpened multi-spectral image data for at least two of said spectral bands to produce pan-sharpened color image data that has a higher resolution than said multi-spectral image data; and, generating a pan-sharpened color image from said pan-sharpened color image data.

2. The method of claim 1 wherein said step of using said MAP super resolution algorithm comprises the steps of:

upsampling said multi-spectral image data for each spectral band to match said data record size of said panchromatic image data and produce upsampled multi-spectral image data;

generating error data by convolving said panchromatic image data and a normalized point spread function;

generating result data by dividing said upsampled image data by said error data and subtracting one;

generating correction data by convolving said result data with said normalized point spread function; and, generating said pan-sharpened multi-spectral image data by exponentiating said panchromatic image data with said correction data for each spectral band.

3. The method of claim 1 further comprising the steps of:

transforming said pan-sharpened color image data from a RGB model, having red, green and blue components, to a HSI model having hue, saturation and intensity components;

modifying said saturation component of said HSI model to cover a dynamic range from values of approximately zero to approximately one;

spatially filtering said intensity component with a high boost filter for edge enhancement;

transforming said HSI model of said pan-sharpened color image data back to said RGB model.

4. A method of generating multi-spectral images from first image data having at least two spectral bands with a predetermined first range of resolution and a second image data having a third spectral band with a second range of resolution that is higher than said first range of resolution comprising the steps of:

detecting an image to generate said first and second image data;

upsampling said first image data to match the data record size of said second image data to produce upsampled first image data;

dividing said upsampled first image data by said second image data and subtracting one from the quotient to produce result data;

exponentiating said second image data with said result data to produce pan-sharpened image data; and, generating said multi-spectral images from said pan-sharpened image data.

5. A method of generating multi-spectral images from first image data having at least two spectral bands with a predetermined first range of resolution and second image data having a third spectral band with a second range of resolution that is higher than said first range of resolution comprising the steps of:

detecting an image to generate said first and second image data;

upsampling said first image data to match the data record size of said second image data to produce upsampled first image data;

generating error data by convolving said second image data with a point spread function that describes corrections for detector optics used to detect said image;

dividing said unsampled first image data by said error data and subtracting one from the quotient to produce result data;

generating correction data by convolving said result data with said point spread function;

exponentiating said second image data with said correction data to produce pan-sharpened image data; and, generating said multi-spectral images from said pan-sharpened image data.

6. A method of increasing the resolution of first image data having a first predetermined resolution using second image data having a second predetermined resolution that is higher than said first predetermined resolution comprising the steps of:

dividing said first image data by said second image data to produce a quotient;

subtracting one from said quotient to produce result data; and, exponentiating said second image data with said result data to produce third image data that is representative of said first image data having a resolution that is substantially equivalent to said second predetermined resolution.

7. The method of claim 6 further comprising the step of: generating an image using said third image data.

8. A device for generating high resolution multi-spectral data from low resolution multi-spectral data and high resolution panchromatic data comprising:

a plurality of first detectors that generate said low resolution multi-spectral data;

at least one second detector that generates said high resolution panchromatic data;

a processor coupled to said plurality of first detectors and said second detector, said processor including:

a divider that divides said low resolution multi-spectral data by said high resolution panchromatic data to produce a quotient;

a subtractor that subtracts one from said quotient to produce result data; and, an exponentiator that exponentiates said high resolution panchromatic data with said result data to produce said high resolution multi-spectral data.

9. A device for generating high resolution multi-spectral data from low resolution multi-spectral data and high resolution panchromatic data comprising:

a plurality of first detectors that generate said low resolution multi-spectral data;

at least one second detector that generates said high resolution panchromatic data;

a processor coupled to said plurality of first detectors and said second detector, said processor including:

a first convolver that convolves said high resolution panchromatic data with a point spread function to produce error data;

a divider that divides said low resolution multi-spectral data by said error data to produce a quotient;

a subtractor that subtracts one from said quotient to produce result data;

a second convolver that convolves said result data and said point spread function to produce correction data; and, an exponentiator that exponentiates said high resolution panchromatic data with said correction data to produce said high resolution multi-spectral data.

10. The device of claim 9 wherein said processor further comprises:

an upsampler that upsamples said low resolution multi-spectral data to match the data record size of said high resolution panchromatic data prior to said divider dividing said low resolution multi-spectral data by said error data.

11. The device of claim 10 further comprising:

a first transformer that transforms said high resolution multispectral data from a RGB model, having red, green and blue components, to a HSI model having hue, saturation and intensity components;

a linear modifier that modifies said saturation component to cover a dynamic range of values from approximately zero to approximately one;

a high boost filter that spatially filters said intensity component for edge enhancement;

a second transformer that transforms said HSI mode of said high resolution multispectral data back to said RGB model.

12. A system for generating high resolution multi-spectral images comprising:

a multisensor detector that generates a plurality of low resolution multi-spectral data signals and at least one high resolution panchromatic data signal from an object that is scanned by said system;

a processor coupled to said multisensor detector that divides said low resolution multi-spectral data signals by said high resolution panchromatic data signal to produce a quotient, subtracts one from said quotient to produce result data and exponentiates said high resolution panchromatic data with said result data to produce pan-sharpened multi-spectral data; and, a display that generates said high resolution multi-spectral image from said pan-sharpened multi-spectral data.

13. The system of claim 12 wherein said system comprises a document scanner.

14. The system of claim 12 wherein said multisensor detector is space based.

15. The system of claim 12 wherein said multisensor detector is airborne.

16. The system of claim 12 wherein said display comprises printer.

* * * * *